United States Patent
Merchel, III et al.

(10) Patent No.: US 10,035,088 B2
(45) Date of Patent: Jul. 31, 2018

(54) ROTARY DRUM FILTERING APPARATUS

(71) Applicants: Frank John Merchel, III, Windham, NH (US); Michael Alan Tardie, Lunenburg, MA (US); Robert Carl Short, Greenfield, NH (US)

(72) Inventors: Frank John Merchel, III, Windham, NH (US); Michael Alan Tardie, Lunenburg, MA (US); Robert Carl Short, Greenfield, NH (US)

(73) Assignee: GL&V USA, Inc., Nashua, NH (US)

( * ) Notice: Subject to any disclaimer, the term of this patent is extended or adjusted under 35 U.S.C. 154(b) by 247 days.

(21) Appl. No.: 14/800,215

(22) Filed: Jul. 15, 2015

(65) Prior Publication Data

US 2017/0014740 A1    Jan. 19, 2017

(51) Int. Cl.
  *B01D 33/067* (2006.01)
  *B01D 33/073* (2006.01)

(52) U.S. Cl.
  CPC ......... *B01D 33/067* (2013.01); *B01D 33/073* (2013.01)

(58) Field of Classification Search
  None
  See application file for complete search history.

(56) References Cited

U.S. PATENT DOCUMENTS

| 3,680,708 | A | 8/1972 | Luthi |
| 3,837,499 | A | 9/1974 | Luthi |
| 4,858,682 | A | 8/1989 | Odelstam |
| 4,906,364 | A | 3/1990 | Luthi et al. |
| 7,115,189 | B2 * | 10/2006 | Baker .................... B01D 29/03 162/233 |
| 7,374,050 | B2 * | 5/2008 | Grace .................. B01D 33/067 210/404 |
| 8,137,568 | B2 * | 3/2012 | Rouillard ............. B01D 33/067 210/402 |
| 2004/0259240 | A1 | 12/2004 | Fadden |
| 2012/0145643 | A1 | 6/2012 | Pandya |

* cited by examiner

*Primary Examiner* — Thomas M Lithgow
(74) *Attorney, Agent, or Firm* — James Earl Lowe, Jr.

(57) ABSTRACT

A drum structure, for a rotary drum filtering apparatus, comprising: a generally annular supporting drum, and a plurality of rib elements carried by the supporting drum longitudinally extending along the circumference of the drum generally in the longitudinal direction of the drum. A duplex stainless steel cover plate extends between two rib elements. A single supporting element supports the cover plate extending between each pair of two rib elements.

2 Claims, 4 Drawing Sheets

5.19 + 2.43 + 6.46 + 2.43 = 16.51 × 2 = 33.02 INCHES WETTED PERIMETER
DECK SUPPORT (1) SUPPORT GRID 40.14 − 33.02 / 40.14 = 17.7% IMPROVEMENT 4.35 + 2.43 + 4.17 + 2.43 = 13.38 × 3 = 40.14 INCHES WETTED PERIMETER
DECK SUPPORT (2) SUPPORT GRIDS

ROTARY DRUM FILTERING APPARATUS

BACKGROUND

The present invention relates to rotary drum filtering apparatus and more particularly to the drum structure of rotary drum filtering apparatus such as, for example, rotary drum filters, thickeners, washers and the like of the type employed for filtering a slurry such as pulp stock.

Conventionally, rotary drum filtering apparatus of this general type have included a drum structure that supports a circumferential filter medium and contains filtrate compartments communicating with the openings in the filter medium for receiving liquid drained through the latter. For example, as illustrated in FIGS. 1 and 2, taken from U.S. Luthi U.S. Pat. No. 3,837,499, a conventional rotary drum filtering apparatus comprises a drum structure, designated generally as 10, partially submerged in a vat or tank 12 which contains a pulp stock or other slurry to be filtered. The drum structure 10 comprises a generally, rotatably driven drum.

The drum structure includes a supporting drum carrying rib elements defining filtrate compartments that extend generally longitudinally along the drum circumference, and corrugated cover elements mounted to the rib elements by clips to form a cover circumferentially around the supporting drum over the filtrate compartments. Each groove of the corrugations in the outer surface of each cover element communicates with a there below filtrate compartment through a louvered opening arranged to discharge liquid in a direction generally towards the discharge end of the communicating filtrate compartment; and one side of each corrugated element is spaced from the there adjacent portions of the drum structure to permit circumferential expansion of the cover elements.

The opposite ends of the drum structure are closed by end closure plates which are connected to trunnions or similar means for rotatably mounting the drum structure on bearing pedestals. One of the trunnions is hollow and communicates with the upper end of a vacuum pipe or barometric leg which, during the operation of the filtering apparatus, serves in the conventional manner to drain filtrate and create and apply a sub-atmospheric pressure or vacuum.

The plurality of imperforate upstanding rib or division elements 30 are rigidly mounted on an outer circumference 20 of the drum circumferentially spaced around the drum to cause circumferentially adjacent ones of the elements 30 of each drum to form opposing side wads of circumferential filtrate compartments 32. The rib elements 30 extend generally longitudinally along the outer drum circumferences 20 substantially throughout the length of their respective drum; thus, the filtrate compartments 32 of each drum extend generally longitudinally along the outer circumference 20 of the latter substantially throughout its extent. The filtrate compartments 32 of each drum have one or more juxtaposed open discharge ends provided with drainage openings communicating with an annular space at the end of the drum.

As illustrated, a single supporting rib element 34 is affixed to each outer circumference 20 intermediate each two or more circumferentially adjacent rib elements 30, the supporting rib elements 34 extending generally longitudinally along the outer circumferences 20 and having openings 36 there through communicating the portions of the filtrate compartments 32 on opposite sides thereof. Alternatively, however, more than one supporting rib element 34 could be provided between each two of the circumferentially adjacent ones of the rib elements 30.

A stationary or non-rotatable valving assembly, designated generally as 40, is mounted in the space at the end of the drum. The valving assembly 40 is closed at its opposite ends by transversely extending end closure was (not shown) and along its opposite sides has side walls 52, one of which is shown in FIG. 2. The sidewalls 52 are each provided with an elongated opening 54 there through; and openings in the drum (not shown) permit air from the initially submerging filtrate compartments 32 to escape to the atmosphere through the elongated openings 54. There are numerous equivalent alternate designs for providing the valve function which are not described here.

The drum structure 10 also includes a corrugated cover mounted circumferentially over the filtrate compartments 32 of each drum. The corrugated cover of the drum is formed by a plurality of separate corrugated cover elements or plates 56, each longitudinally the length of one of the filtrate compartments 32 and transversely or circumferentially a width slightly less than one of the filtrate compartments 32, which are mounted along opposite side edges to circumferentially adjacent ones of the rib elements 30. The corrugated cover plates each include an inner face or surface bounding the circumferentially outer side of a respective filtrate compartment 32 and an outer face or surface facing away from such filtrate compartment 32; and the circumferentially adjacent ones of the cover elements 56 of each drum are circumferentially spaced one from the other by the rib element 30. The inner face of each cover element 56 is supported on, but preferably not rigidly affixed to, the intermediate rib 34 in the overload filtrate compartment.

The corrugations of the cover elements 56 extend circumferentially of the drum to provide the inner face of each cover element 56 with substantially parallel, alternate, transverse ridges and grooves while providing the outer face of each cover element 56 with similar generally parallel, alternate, transverse ridges and grooves. The grooves and ridges extend the full width of the cover elements 56. Corrugations easily accommodate thermal expansion, which is a feature inherent in the design. The formation of the corrugations transversely of the cover elements 56 provides the cover elements 56 with substantial inherent flexibility because of thermal changes in the longitudinal direction of the drum.

As illustrated in FIG. 2, the cover elements 56 are supported in their positions overlaying the filtrate compartments 32 on the rib elements 30 by a mounting means comprising a generally "U" shaped mounting clip 70 on each of the rib elements 30. The mounting clips 70, inverted to snuggly receive the upper sides of the rib elements 30 in their recesses 72, extend throughout the lengths of the rib elements 30 and throughout their lengths have integral supporting portions extending outwardly from the opposite side walls bounding the recesses 72. The mounting clips 70 of the drum structure 10 are individual elements formed separately of the cover elements 56.

One edge of each cover element 56 is welded or otherwise rigidly affixed to the side wall and supporting portion of the there adjacent mounting clip in abutting relationship with the side wall to prevent liquid flow between the edge and the there adjacent element 30. The opposite edge of each cover element 56 is illustrated as supported by the supporting portion of the there adjacent mounting clip 70 in interlocking relationship with the latter. The opposite edge of the cover element 56 is throughout its length spaced from the side wall (and hence from the there adjacent rib element 30) by a gap or clearance, thereby permitting lateral expansion of the cover element 56.

Each groove in each cover element 56 is provided with a louvered opening or port 88 communicating the groove with the there below filtrate compartment 32 for draining liquid from the former to the latter. The louvered openings 88, as best shown in FIG. 2, are adjacent the bottoms of the grooves; and the louvers 90 for the openings 88 are arranged to direct the liquid flowing from the grooves through the openings 88 to the filtrate compartments 32 in a direction towards the ends of the filtrate compartments 32 having the openings. Although only a single louvered opening 88 located adjacent the edge of the cover element 56 is shown in communication with each groove in the illustrated embodiment, it will be understood that, if desired or required, additional louvered openings 88 could be provided for each of the grooves 68.

The usual wire filter medium 92 is affixed around each drum and supported on the peaks of the ridges of the outer surface of the cover elements 56 and the mounting cups 70.

In the operation of the filtering apparatus, the drum structure 10 is rotatably driven in the clockwise direction (as viewed in FIG. 1) to successively drive the filtrate compartments 32 below the level of the slurry in the vat 12 for solid material accretion on the filter medium 92 and then above such level for drying of accumulated solid material and removal of such material by doctor means (not shown) generally at the location of the roller 94. During the initial submergence of the filtrate compartments 32 into the slurry, solid material accretion is effected without the assistance of the sub-atmospheric pressure, but air in the initially submerging filtrate compartments 32 is allowed to escape to the atmosphere. Below the lower most ends of the was 52, sub-atmospheric pressure is applied to the filtrate compartments 32 through their open ends and additional solid material is resultantly collected on the filter medium 92. The sub-atmospheric pressure continues to be applied to the compartments 32 as the latter are rotated above the level of the slurry and the accumulated solid material is being dried. The sub-atmospheric pressure is cut-off from the filtrate compartments 32 as they are rotated to the upper end of the wads where the dried collected solid material is removed from the filter medium 92 preparatory to the commencement of another filter cycle.

The liquid drained through the openings in the filter medium 92 passes into the grooves in outer surfaces of the cover elements 56 and flows in such grooves circumferentially of the drum structure 10 to the louvered openings 88 which discharge the liquid to the there below filtrate compartments 32 in a direction generally towards the openings at the discharge ends of the filtrate compartments 32.

Pressure Losses

The filtering apparatus, such as a rotary drum washer, thus depends on the presence of an efficient vacuum to efficiently dewater a pulp mat. Improving the vacuum improves the operation and, most importantly, the efficiency of the drum washer. The drum structure, with its myriad of wet surfaces, produces a restriction on the creation of an efficient vacuum. A primary source of pressure loss is due to the drag associated with each wetted surface. There has therefore long been a need to economically reduce the amount of wetted surfaces within the drum washers to improve the efficiency of the washer. One needed but otherwise non-essential part of the drum are the supports used to support the drum surface; the winding wire or decking. The winding wire or decking ultimately supports the face wire (mesh) which captures the pulp mat. As demonstrated in the U.S. Luthi U.S. Pat. No. 3,837,499, and as commercialized for at least 40 years, the demonstrated standard spacing in order to support the drum surface has been a distance of about 3 inches between drum surface supports. Or expressed another way, about 4 supports per foot of diameter of drum. For example, current drum diameters of 8 feet, 9.6 feet, and 13.6 feet have 35, 50 and 54 supports, respectively. There has therefore long been a need to reduce the number of drum surface supports per diameter of drum, but no known way to do so.

SUMMARY

Disclosed is a drum structure, for a rotary drum filtering apparatus, comprising: a generally annular supporting drum, and a plurality of rib elements carried by the supporting drum longitudinally extending along the circumference of the drum generally in the longitudinal direction of the drum. A duplex stainless steel cover plate extends between two rib elements. A single supporting element supports the cover plate extending between each pair of two rib elements.

Figure 1:
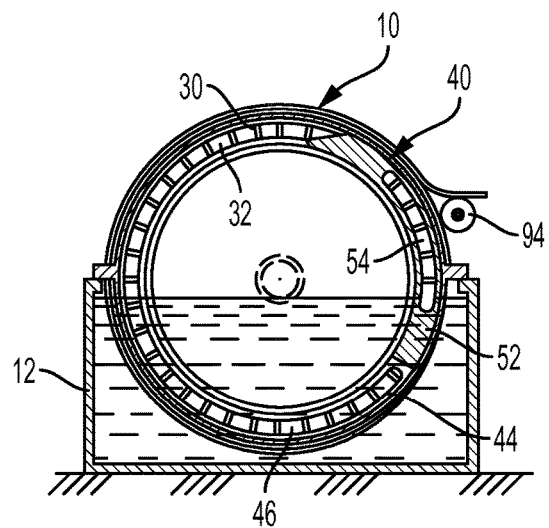
FIG. 1 is an elevation sectional view of a conventional rotary drum filtering apparatus.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting, Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF THE EMBODIMENT

Figure 2:
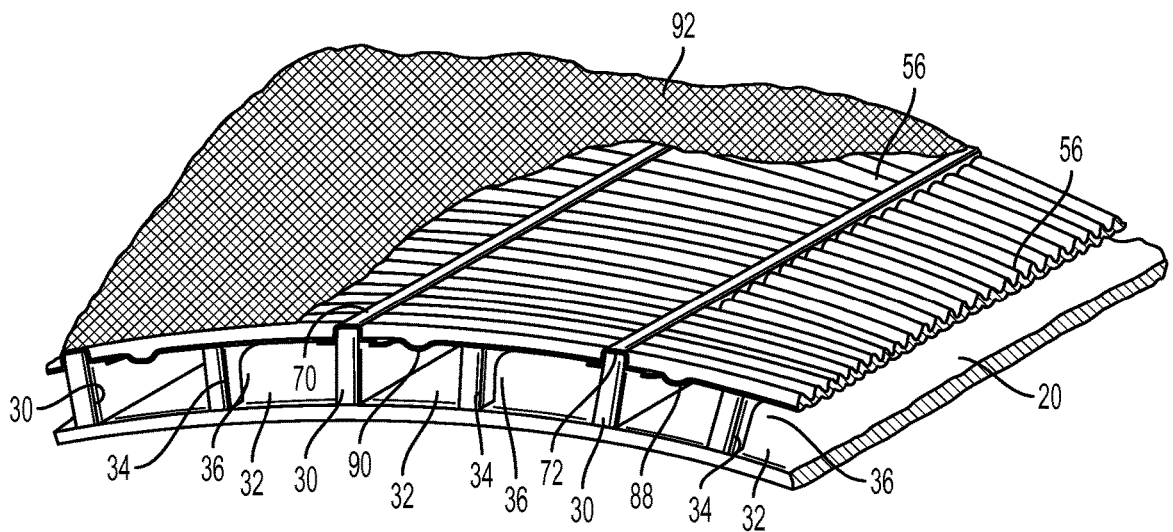
FIG. 2 is an enlarged, fragmentary perspective view showing a portion of the drum structure of the rotary drum filtering apparatus of FIG. 1.
Figure 3A:
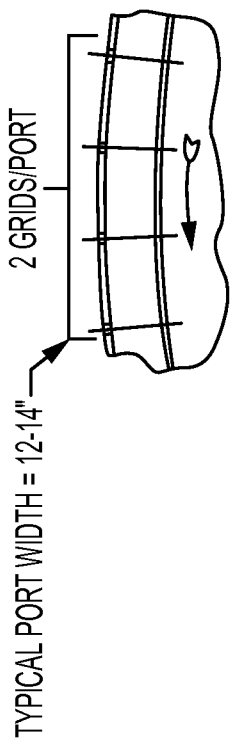
FIGS. 3A-3C are cross sectional side views of a portion of the drum and deck support structure of various conventional drum washers.
Figure 3B:
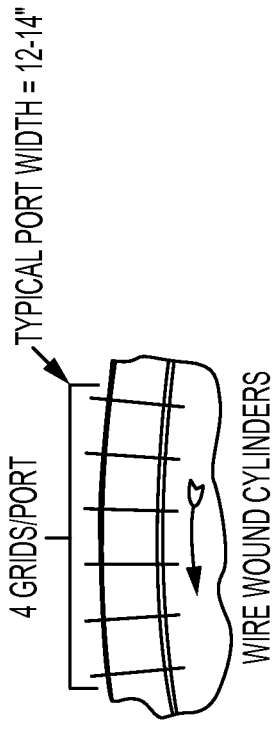
Figure 3C:
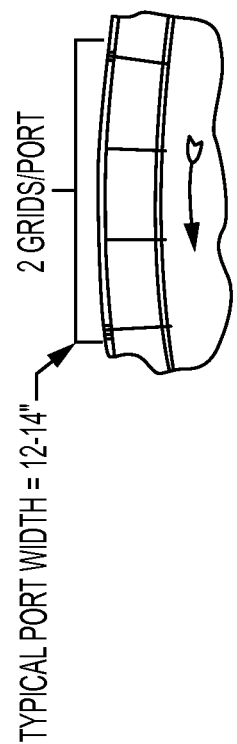
Figure 4:
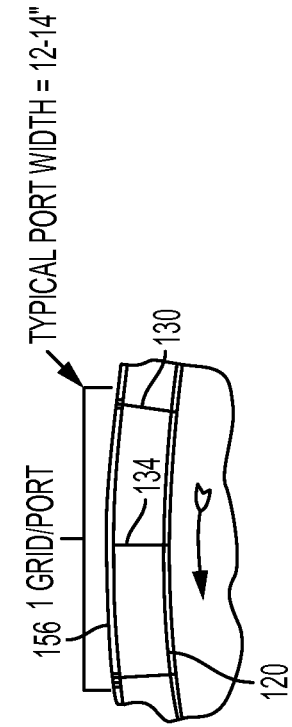
FIG. 4 is a cross sectional side views of a portion of the drum and deck support structure of the drum washer of this disclosure.
Figures 5, 6:
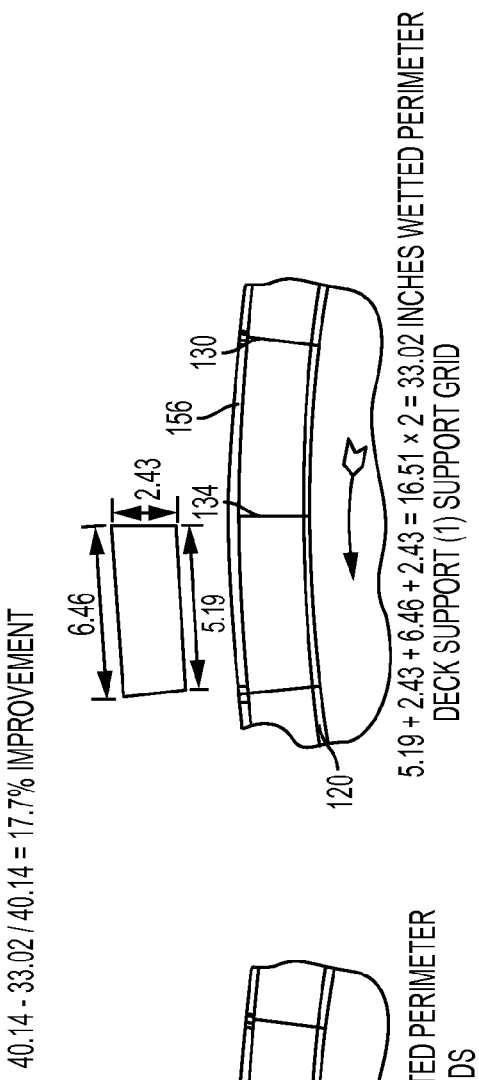
FIG. 5 is a cross sectional side views of a portion of the drum and deck support structure of FIG. 3C with a calculation showing the amount of wetted surface.
FIG. 6 is a cross sectional side views of a portion of the drum and deck support structure of FIG. 4 with a calculation showing the amount of wetted surface.

Illustrated in FIGS. 4 and 6 is a rotary drum filtering apparatus 100 (see FIG. 3) including a drum structure 110 that supports a circumferential filter medium 192, the drum structure 110 having filtrate compartments 132 communicating with openings in the filter medium 192 for receiving liquid drained through the latter. Like elements to those of FIGS. 1 and 2 have similar numbering, only with 100 added to the number shown in FIGS. 1 and 2.

The drum structure 110 includes a supporting drum 114, radially extending rib elements 130 supported on the drum 114 and defining filtrate compartments 132 which extend generally longitudinally along the drum circumference, and duplex steel corrugated cover elements 156. The cover elements 156 thus form a cover circumferentially around the supporting drum over the filtrate compartments. Between each pair of the radially extending rib elements 130 are one support element 134 to provide additional support to the underside of the cover elements 156.

Figure 7:
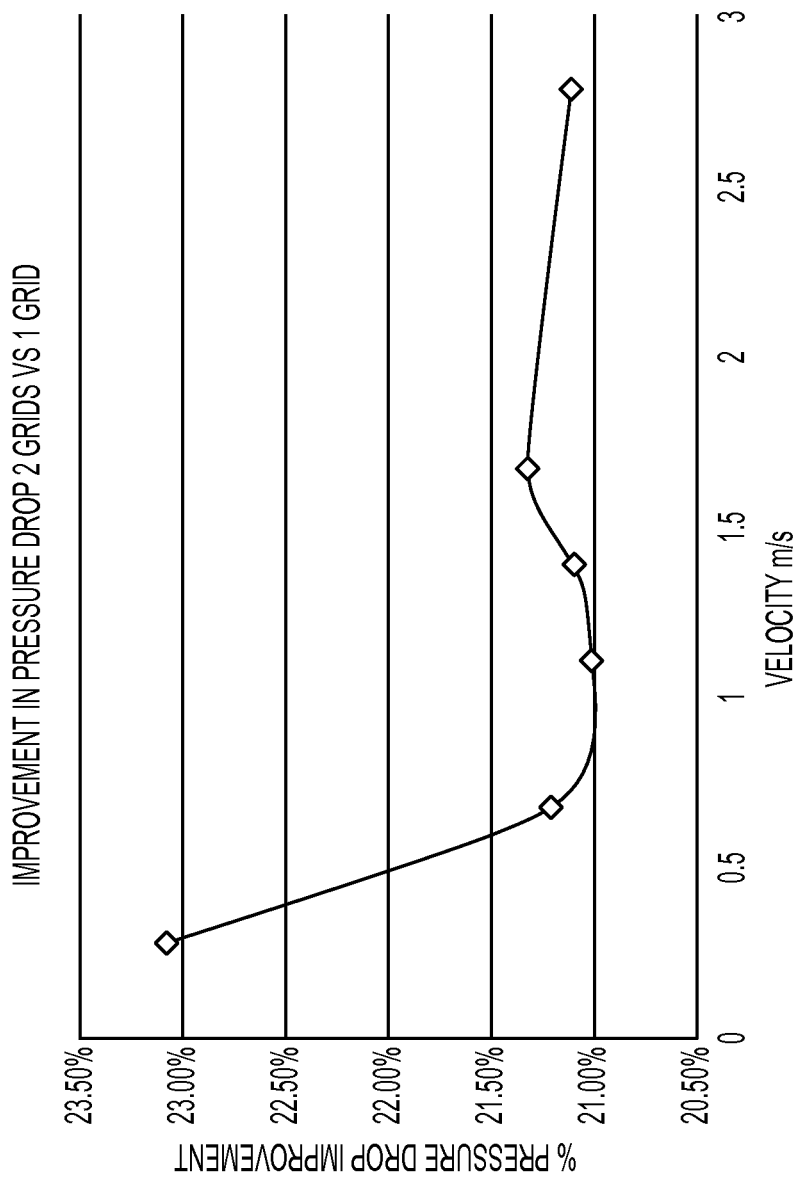
FIG. 7 is a chart showing the percent of pressure drop improvement provided by the drum washer of this disclosure, compared to a conventional drum washer, as a percentage of drum circumference speed.

After a lengthy investigation encompassing technical analysis, material investigation, mechanical and corrosion testing, manufacturability trials, and development of special tooling, Applicants have discovered that duplex stainless steel cover plates have the necessary corrosion resistant and strength in order to reduce the number of drum surface supports per diameter of drum down to 3 supports per foot of diameter of drum diameter, as measured from cover plate to cover plate. This reduction in the number of supports produces a 18% percent reduction in the amount of wetted surface present in the drum and produces an increase in vacuum efficiency of about 21%, as demonstrated by FIGS. 5 to 7. It is important to note that pressure drop varies with velocity, however, for the drum washer range of velocities, the improvement is seen as more than 21% as demonstrated by the curves in the graph of FIG. 7.

Typical austenitic stainless steels have a yield strength of 28,000 psi. Duplex stainless steels have a yield strength of 67,000 psi., 2.4 times stronger than conventional austenitic stainless steel.

The difficulty in selecting a material to make the deck is the requirement that it be both corrosion resistant and strong. Duplex stainless steel is comprised of a unique balance of ferrite and austenite. The ferritic component gives the material high strength properties, while the austenitic component gives the material high corrosion resistance. This balance between Austenite and Ferrite must be preserved through the manufacturing process, otherwise, strength and/or corrosion resistance will be compromised. This balance can be affected by the addition of heat which, if not controlled, will allow the formation of detrimental intermetallic phases. The use of the duplex material is thus especially appropriate for a drum washer deck prepared by a cod forming process.

Typical material coil pricing for duplex stainless versus austenitic stainless is as follows, in US Dollars per pound. Austenitic 304 L $ 2.48; Austenitic 316 L $ 2.55; Austenitic 6-7% $ 8.30; Duplex 2205 $ 2.09; Duplex 2507 $ 3.86.

Material savings with Duplex 2507 is depicted as 53% less cost than conventional 6-7%. Material savings with Duplex 2205 is depicted as 18% less cost than conventional 316 L. And additional labor and material savings are available due to the removal of (1) support (Grid) in each current port (channel). Current commercial drum washer offerings have two supports per port. Duplex stainless steel corrugated cover elements thus provide an economical material with superior strength and corrosion resistance, that when used in a filtering apparatus, creates a device with less pressure drop than conventional devices.

Various other features of this disclosure are set forth in the following claims.

The invention claimed is:

1. A drum structure for rotary drum filtering apparatus, comprising a generally annular supporting drum, a plurality of rib elements carried by said supporting drum longitudinally extending along the circumference of said drum generally in the longitudinal direction of said drum, said rib elements being circumferentially spaced around said drum to define a plurality of filtrate compartments which longitudinally extend along the circumference of said drum generally in the longitudinal direction of said drum, said filtrate compartments having juxtaposed drainage openings through which liquid is drained from the filtrate compartments, a plurality of corrugated cover plates, each extending around only a portion of said supporting drum spaced outwardly from said supporting drum by said filtrate compartments, and supporting elements carried by said supporting drum longitudinally extending along the circumference of said drum generally in the longitudinal direction of the latter intermediate said rib elements, each supporting element supporting the cover plate extending between each pair of two rib elements, the number of rib elements and support elements for a drum at least 8 feet in diameter being 3 per foot of drum diameter, as measured from cover plate to cover plate.

2. The drum structure according to claim 1 wherein the corrugated cover plates are made of duplex stainless steel.

* * * * *